(12) United States Patent
Tashiro et al.

(10) Patent No.: US 9,142,943 B2
(45) Date of Patent: Sep. 22, 2015

(54) ELECTRICAL JUNCTION BOX

(71) Applicant: Yazaki Corporation, Tokyo (JP)

(72) Inventors: Hiroki Tashiro, Makinohara (JP);
Hideki Kawamura, Makinohara (JP);
Yuki Komiya, Makinohara (JP)

(73) Assignee: Yazaki Corporation, Tokyo (JP)

( * ) Notice: Subject to any disclaimer, the term of this patent is extended or adjusted under 35 U.S.C. 154(b) by 59 days.

(21) Appl. No.: 14/077,294

(22) Filed: Nov. 12, 2013

(65) Prior Publication Data
US 2014/0131089 A1 May 15, 2014

(30) Foreign Application Priority Data

Nov. 14, 2012 (JP) .................................. 2012-249863

(51) Int. Cl.
*H02G 3/08* (2006.01)
*H02G 3/16* (2006.01)

(52) U.S. Cl.
CPC ... *H02G 3/08* (2013.01); *H02G 3/16* (2013.01)

(58) Field of Classification Search
CPC ......... H02G 3/08; H02G 3/081; H02G 3/088; H02G 3/16; H05K 5/00; H05K 5/02; H05K 5/04; H05K 7/06; B60R 16/00; B60R 16/0239; B60R 16/02; H01H 9/02; H01H 9/04

USPC ................... 174/50, 520, 59, 535, 559, 560; 439/76.1, 76.2, 949, 535; 361/600, 361/601, 679.01, 730, 752, 760, 761
See application file for complete search history.

(56) References Cited

U.S. PATENT DOCUMENTS

| 6,022,247 | A  * | 2/2000  | Akiyama et al. ............. 439/76.2 |
| 7,699,623 | B2 * | 4/2010  | Yoshida et al. ................ 174/50 |
| 7,785,116 | B2 * | 8/2010  | Akahori et al. ............. 439/76.2 |
| 8,419,443 | B2 * | 4/2013  | Kamo .......................... 439/76.1 |
| 8,523,612 | B2 * | 9/2013  | Maebashi ..................... 439/76.2 |
| 8,794,982 | B2 * | 8/2014  | Yamamoto et al. .......... 439/76.2 |
| 8,835,760 | B2 * | 9/2014  | Saimoto et al. ................ 174/50 |
| 8,878,059 | B2 * | 11/2014 | Makino .......................... 174/50 |

FOREIGN PATENT DOCUMENTS

JP          2011-015467 A    1/2011

* cited by examiner

*Primary Examiner* — Angel R Estrada
(74) *Attorney, Agent, or Firm* — Locke Lord LLP

(57) ABSTRACT

An object of the present invention is to provide an electrical junction box allowing a hollow cavity portion and a component receiving portion to be easily distinguished from each other so that the workability upon inserting components is improved. The electrical junction box includes a cassette block. Electronic components such as relay or fuse are mounted on an upper surface of the cassette block, and a bus bar and a terminal are inserted into a lower surface of the cassette block. The lower surface of the cassette block is provided with a bus bar receiving portion into which the bus bar is inserted, a terminal receiving portion into which the terminal is inserted, and a plurality of hollow cavity portions adjacent to the bus bar receiving portion and the terminal receiving portion and into which no component is inserted.

1 Claim, 4 Drawing Sheets

ELECTRICAL JUNCTION BOX

CROSS REFERENCE TO RELATED APPLICATIONS

This application is on the basis of Japanese Patent Application No. 2012-249863, the contents of which are hereby incorporated by reference.

TECHNICAL FIELD

The present invention relates to an electrical junction box.

BACKGROUND ART

FIG. 4 is an exploded view showing a conventional electrical junction box (see PTL 1). The electrical junction box 201 shown in FIG. 4 includes: a box main body 202; cassette blocks 203A, 203B attached to the box main body 202; an upper cover (not shown) for covering an opening 202b of the box main body 202; and a lower cover (not shown) for covering an opening 202a of the box main body 202. Incidentally, the electrical junction box 201 shown in FIG. 4 is upside down with respect to an actual mounting direction on a vehicle.

The cassette blocks 203A, 203B are made of synthetic resin, and outer shapes thereof are formed in a block shape. Electronic components such as fuse or relay are mounted on an upper surface 203a of each of the cassette blocks 203A, 203B. A lower surface 203b of each of cassette blocks 203A, 203B is provided with a terminal receiving portion 231 (component receiving portion) into which a terminal attached to an end of an electric wire 208 is inserted, a bus bar receiving portion (component receiving portion) into which a bus bar is inserted, and a hollow cavity portion into which no component is inserted. Lower ends of the terminal receiving portion 231, the bus bar receiving portion, and the hollow cavity portion are aligned at the same height. Incidentally, the electric wire 208 connected to the cassette block 203A is only partially shown, and the electric wire 208 connected to the cassette block 203B is not shown.

CITATION LIST

Patent Literature

PTL 1: JP, A, 2011-15467

SUMMARY OF INVENTION

Technical Problem

However, in the above electrical junction box 201, because the lower ends of the terminal receiving portion 231, the bus bar receiving portion, and the hollow cavity portion are aligned at the same height, it is hard to distinguish the lower ends of the terminal receiving portion 231, the bus bar receiving portion, and the hollow cavity portion, and there is a problem that the workability upon inserting components is low. In particular, sizes of an insertion opening of the terminal receiving portion 231 and an opening of the hollow cavity portion are similar, there is a problem that a terminal may be inserted into the hollow cavity portion.

Accordingly, an object of the present invention is to provide an electrical junction box allowing a hollow cavity portion and a component receiving portion to be easily distinguished from each other so that the workability upon inserting components is improved.

Solution to Problem

For attaining the object, according to a first aspect of the present invention, there is provided an electrical junction box including a frame,
wherein an electronic component is mounted on an upper surface of the frame, and a bus bar or a terminal is inserted into a lower surface of the frame,
wherein the lower surface of the frame is provided with a component receiving portion into which the bus bar or the terminal is inserted and a plurality of hollow cavity portions into which no component is inserted, and
wherein a lower end of at least one of the plurality of hollow cavity portions is situated 1 to 5 mm nearer the upper surface than a lower end of the component receiving portion.

Advantageous Effects of Invention

According to the invention described in the first aspect, because a lower end of at least one of the plurality of hollow cavity portions is situated 1 to 5 mm nearer the upper surface than a lower end of the component receiving portion, the hollow cavity portion and the component receiving portion are easily distinguished, and the workability upon inserting the bus bar and the terminal is increased.

These and other objects, features, and advantages of the present invention will become more apparent upon reading of the following detailed description along with the accompanied drawings.

DESCRIPTION OF EMBODIMENTS

An electrical junction box according to an embodiment of the present invention will be explained with respect to FIGS. 1 to 3. The electrical junction box of the present invention is mounted on a vehicle and supplies electric power and signals to on-vehicle electronic devices. Further, in the present invention, a junction block (or a junction box), a fuse block (or a fuse box), and a relay block (or a relay box) are hereinafter collectively referred to as an electrical junction box.

Figure 1:
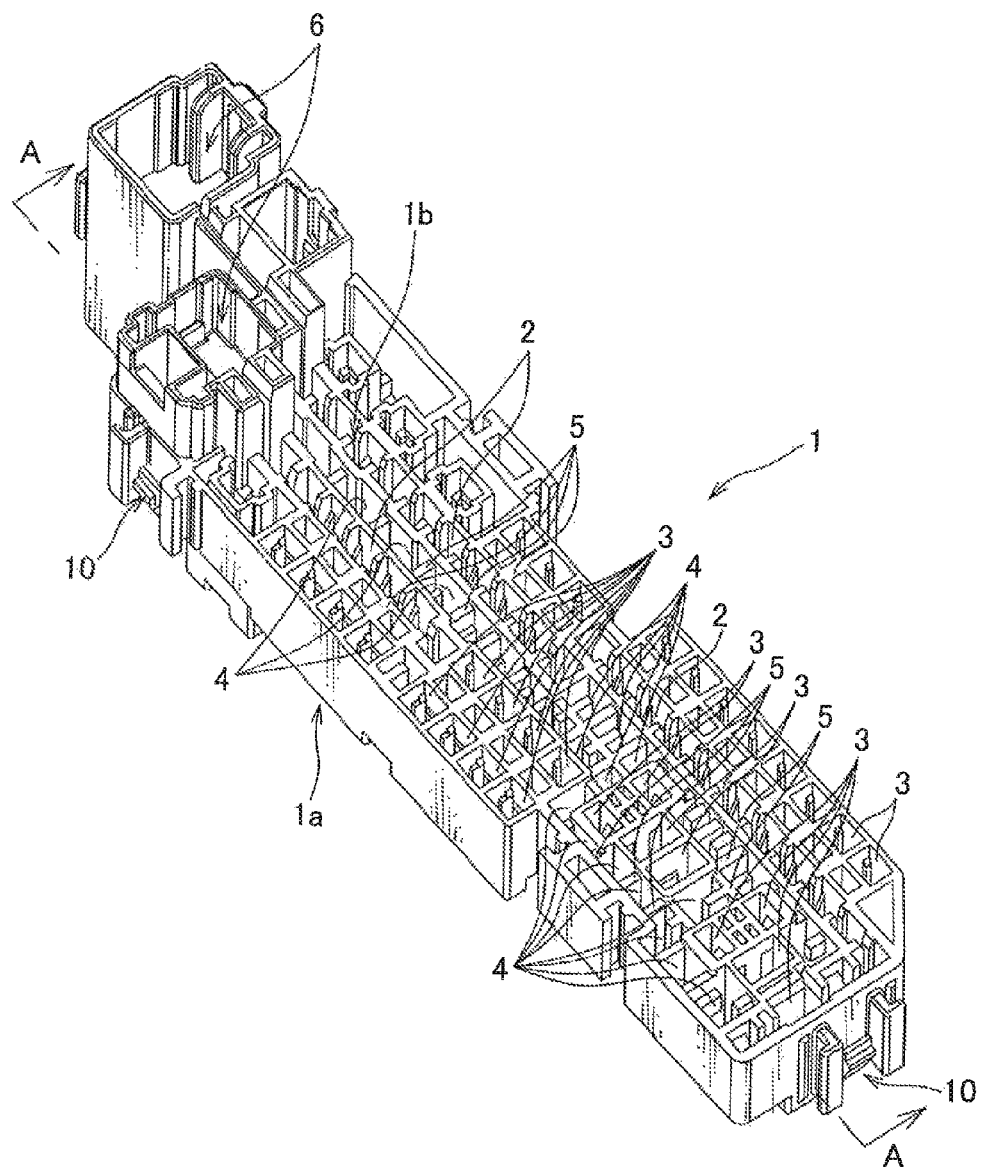
FIG. 1 is a perspective view showing a frame of an electrical junction box according to an embodiment of the present invention.
Figure 2:
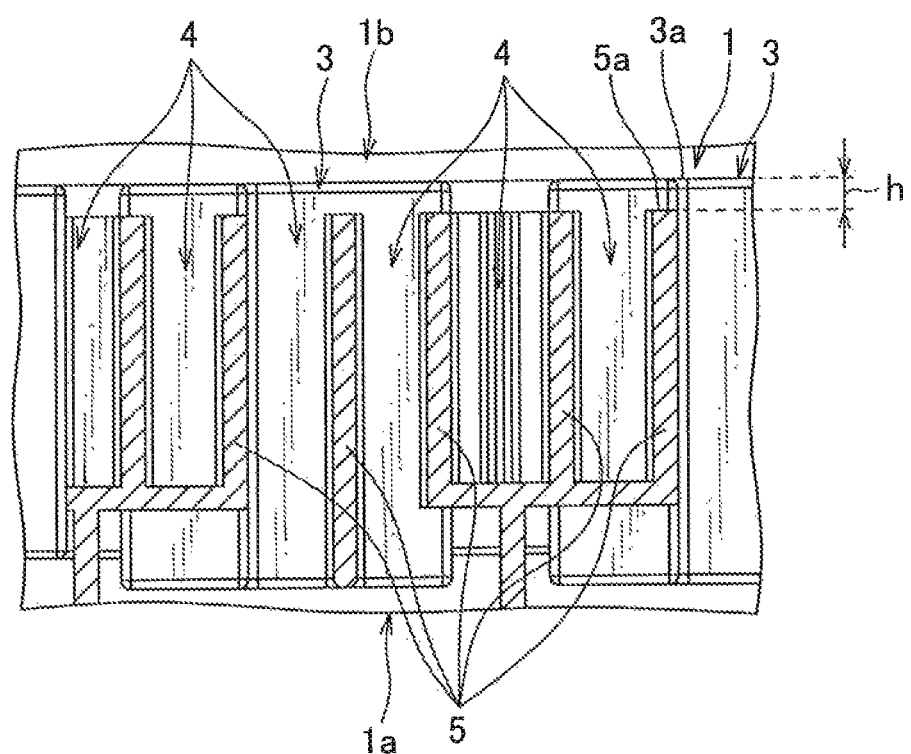
FIG. 2 is a sectional view taken on line A-A in FIG. 1.

The electrical junction box includes: a synthetic-resin-made cassette block 1 shown in FIG. 1; and a synthetic-resin-made case main body (not shown) for receiving the cassette block 1. Further, the cassette block 1 and the case main body define a frame in claims.

Electronic components such as relay or fuse are mounted on an upper surface 1a of the cassette block 1, and a bus bar and a terminal are inserted into a lower surface 1b of the cassette block 1. The bus bar is a wiring member made by pressing a metal plate or the like. The terminal is attached to an end of an electric wire. The lower surface 1b of the cassette block 1 is provided with a bus bar receiving portion 2 (corresponding to the component receiving portion in claims) into which the bus bar is inserted, a terminal receiving portion 3 (corresponding to the component receiving portion in claims) into which the terminal is inserted, a hollow cavity portion 4 adjacent to the bus bar receiving portion 2 and the terminal receiving portion 3 and into which no component is inserted, and an insertion portion 6 into which the bus bar and an input power line connected to the bus bar are inserted. Further, a locking portion 10 for locking with the case main body is provided on a side surface of the cassette block 1.

The bus bar receiving portion 2 is formed in a groove shape able to receive the bus bar. The terminal receiving portion 3 is formed in a rectangular tube shape able to receive the terminal. Lower ends of the bus bar receiving portion 2 and the terminal receiving portion 3 are aligned at the same height. The insertion portion 6 is formed in a rectangular tube shape, and adjacent to the bus bar receiving portion 2. A lower end of the insertion portion 6 is projected about 10 mm from the lower end of the terminal receiving portion 3.

The hollow cavity portion 4 is formed in a tube shape by an outer surface of a wall defining the bus bar receiving portion 2, an outer surface of a wall defining the terminal receiving portion 3, an outer wall of the cassette block 1, and a partition wall 5 partitioning the hollow cavity portions 4 adjacent to each other. The partition wall 5 is provided for increasing the rigidity of the cassette block 1. Further, a mesh portion B and a diagonal portion C in FIG. 3 are the hollow cavity portions 4.

Figure 3:
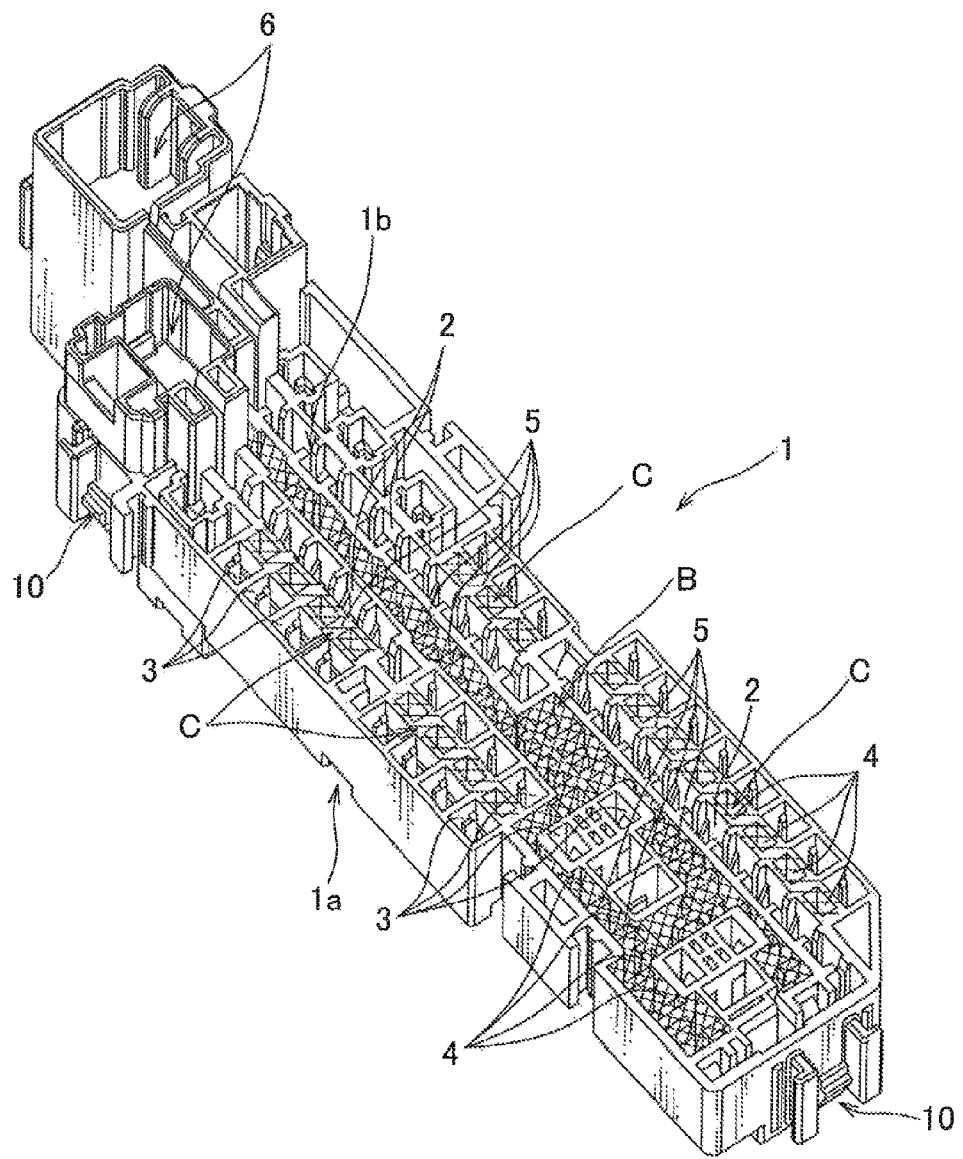
FIG. 3 is an explanatory view for explaining a configuration of the frame shown in FIG. 1.
Figure 4:
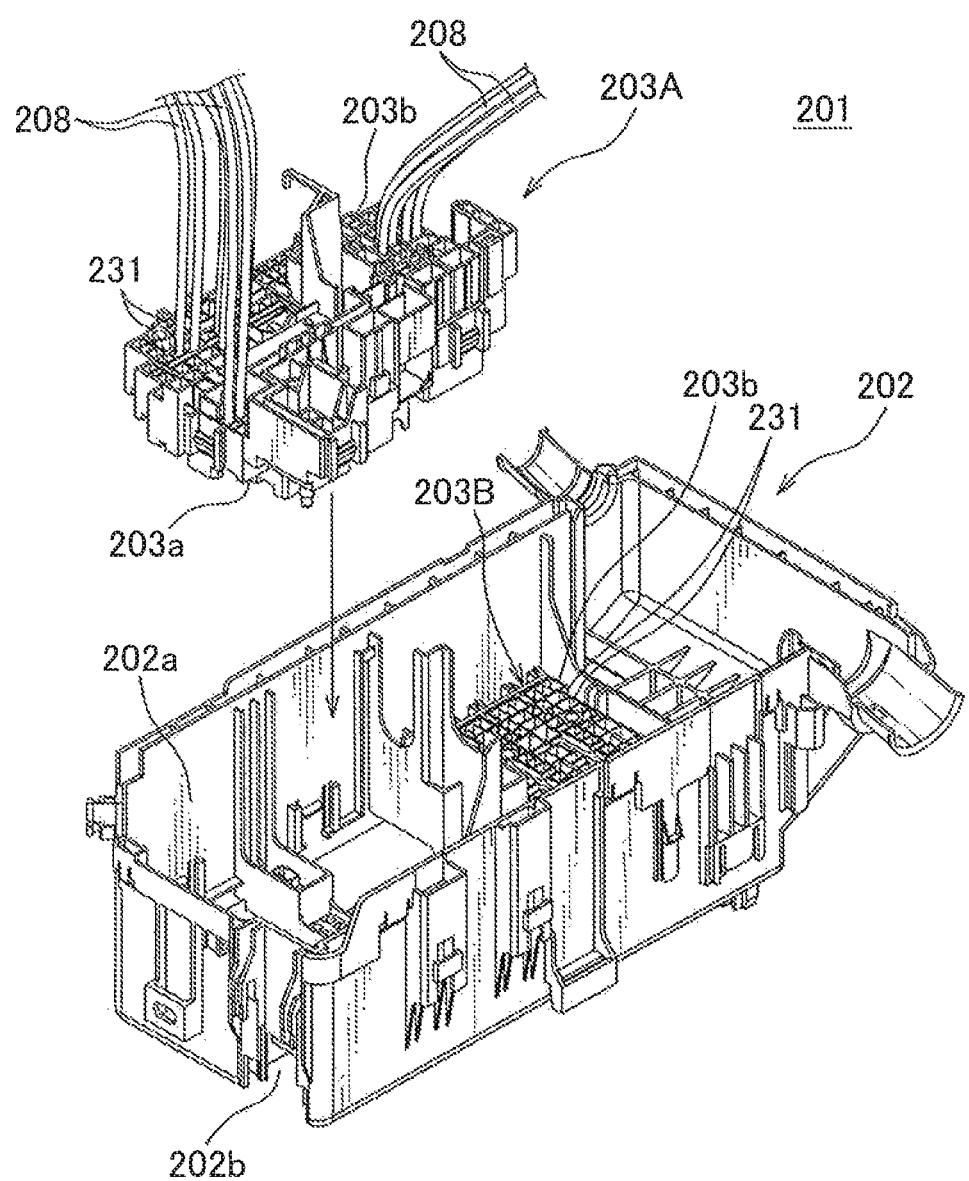
FIG. 4 is an exploded view showing a conventional electrical junction box.

Further, among a plurality of hollow cavity portions 4, a lower end of the hollow cavity portion 4 positioned in the mesh portion B in FIG. 3 is positioned 1 to 2 mm nearer the upper surface 1a than lower ends of the bus bar receiving portion 2 and the terminal receiving portion 3. Further, among a plurality of hollow cavity portions 4, a lower end of the hollow cavity portion 4 positioned in the diagonal portion C in FIG. 3 is aligned at the same height with the lower ends of the bus bar receiving portion 2 and the terminal receiving portion 3. The lower end of the hollow cavity portion 4 positioned in the mesh portion B is a lower end 5a of the partition wall 5 positioned in the mesh portion B. As shown in FIG. 2, the lower end 5a of the partition wall 5 is positioned a size h nearer the upper surface 1a than a lower end 3a of the adjacent terminal receiving portion 3. The size h of this embodiment is, as described above, 1 to 2 mm.

This size h allows the bus bar receiving portion 2 and the terminal receiving portion 3 to be easily distinguished from the hollow cavity portion 4 and allows the rigidity of the cassette block 1 not to be reduced. In the present invention, the size h is within 1 to 5 mm. Further, the most preferable size h in the present invention is, as described above, within 1 to 2 mm.

According to such an electrical junction box, because the lower end 5a of the hollow cavity portion 4 positioned in the mesh portion B in FIG. 3 is positioned 1 to 2 mm nearer the upper surface 1a than the lower ends of the bus bar receiving portion 2 and the terminal receiving portion 3, the hollow cavity portion 4 is easily distinguished from the bus bar receiving portion 2 and the terminal receiving portion 3, and the workability upon respectively inserting the bus bar and the terminal into the bus bar receiving portion 2 and the terminal receiving portion 3 is improved. Further, if the lower end 5a of the hollow cavity portion 4 is projected further than the lower ends of the bus bar receiving portion 2 and the terminal receiving portion 3, it is difficult to respectively insert the bus bar and the terminal into the bus bar receiving portion 2 and the terminal receiving portion 3. However, in this electrical junction box, because the lower end 5a of the hollow cavity portion 4 positioned in the mesh portion B in FIG. 3 is positioned nearer the upper surface 1a than the lower ends of the bus bar receiving portion 2 and the terminal receiving portion 3, the workability upon inserting the bus bar and the terminal is not reduced.

Further, in the above electrical junction box, the reason why only the lower end 5a of the hollow cavity portion 4 positioned in the mesh portion B in FIG. 3 is positioned nearer the upper surface 1a than the lower ends of the bus bar receiving portion 2 and the terminal receiving portion 3, and the lower end of the hollow cavity portion 4 positioned in the diagonal portion C is aligned at the same height with the lower ends of the bus bar receiving portion 2 and the terminal receiving portion 3 is as follows.

Namely, a size of the opening portion of the hollow cavity portion 4 positioned in the mesh portion B in FIG. 3 is similar to a size of an insertion opening of the adjacent terminal receiving portion 3. Therefore, there is a fear that the terminal may be inserted into the hollow cavity portion 4. For preventing this, the lower end 5a of the hollow cavity portion 4 is positioned nearer the upper surface 1a than the lower ends of the bus bar receiving portion 2 and the terminal receiving portion 3.

In contrast, a size of the opening of the hollow cavity portion 4 positioned in the diagonal portion C in FIG. 3 is slightly smaller than a size of the insertion opening of the adjacent terminal receiving portion 3 and prevents the terminal from being inserted into the opening even if mistakenly tried to insert the terminal into the hollow cavity portion 4. Therefore, the lower end of the hollow cavity portion 4 is aligned at the same height with the lower ends of the bus bar receiving portion 2 and the terminal receiving portion 3. Further, in the hollow cavity portion 4 positioned in the diagonal portion C in FIG. 3, there is no fear that the terminal may be mistakenly inserted. However, for easily distinguishing the hollow cavity portion 4 from the terminal receiving portion 3, of course there is no problem that the lower end of the hollow cavity portion 4 may be positioned nearer the upper surface 1a than the lower ends of the bus bar receiving portion 2 and the terminal receiving portion 3.

Further, according to the above embodiment, the cassette block 1 is separated from the case main body. However, according to the present invention, the cassette block 1 may be integral with the case main body.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

REFERENCE SIGNS LIST 1 frame
1a upper surface
1b lower surface
2 bus bar receiving portion (component receiving portion)
3 terminal receiving portion (component receiving portion)
4 hollow cavity portion

What is claimed is:

1. An electrical junction box comprising a frame,
wherein an electronic component is mounted on an upper surface of the frame, and a bus bar or a terminal is inserted into a lower surface of the frame,
wherein the lower surface of the frame is provided with a component receiving portion into which the bus bar or the terminal is inserted and a plurality of hollow cavity portions into which no component is inserted, and wherein a lower end of at least one of the plurality of hollow cavity portions is situated 1 to 5 mm nearer the upper surface than a lower end of the component receiving portion.

* * * * *